(12) United States Patent
Christe et al.

(10) Patent No.: US 11,846,045 B2
(45) Date of Patent: Dec. 19, 2023

(54) HYBRID YARN AND DEVICE AND METHOD FOR PRODUCING A HYBRID YARN

(71) Applicant: SSM Schärer Schweiter Mettler AG, Wädenswil (CH)

(72) Inventors: Marcel Christe, Rüti (CH); Silvan Schäfli, Staufen (CH)

(73) Assignee: SSM Schärer Schweiter Mettler AG, Wädenswil (CH)

( * ) Notice: Subject to any disclaimer, the term of this patent is extended or adjusted under 35 U.S.C. 154(b) by 240 days.

(21) Appl. No.: 17/423,529

(22) PCT Filed: Jan. 16, 2020

(86) PCT No.: PCT/IB2020/050329
§ 371 (c)(1),
(2) Date: Jul. 16, 2021

(87) PCT Pub. No.: WO2020/148691
PCT Pub. Date: Jul. 23, 2020

(65) Prior Publication Data
US 2022/0074085 A1   Mar. 10, 2022

(30) Foreign Application Priority Data
Jan. 18, 2019 (CH) .................... 00059/19

(51) Int. Cl.
*D02G 3/04* (2006.01)
(52) U.S. Cl.
CPC ......... *D02G 3/04* (2013.01); *D10B 2401/041* (2013.01)

(58) Field of Classification Search
CPC ................ D02G 1/18; D02G 3/04; D02J 1/18
See application file for complete search history.

(56) References Cited

U.S. PATENT DOCUMENTS

| | | | |
|---|---|---|---|
| 5,000,807 A * | 3/1991 | Stuart | ................. B65H 51/015 156/181 |
| 5,355,567 A | 10/1994 | Holliday | |
| 6,033,779 A | 3/2000 | Andrews | |
| 7,571,524 B2 * | 8/2009 | Kawabe | .................... D02J 1/18 28/282 |
| 8,137,094 B2 * | 3/2012 | Boissonnat | ............. C03B 37/03 65/486 |

(Continued)

FOREIGN PATENT DOCUMENTS

| | | |
|---|---|---|
| DE | 42 43 465 A1 | 7/1993 |
| DE | 10 2007 028 373 A1 | 12/2008 |
| DE | 10 2011 010 592 A1 | 8/2012 |

(Continued)

OTHER PUBLICATIONS

Swiss Search Report, dated Apr. 4, 2019.
PCT Search Report. dated Feb. 24, 2020.

*Primary Examiner* — Shaun R Hurley
(74) *Attorney, Agent, or Firm* — Dority & Manning, P.A.

(57) ABSTRACT

A hybrid yarn, and associated system and method of making, are provided wherein a first continuous yarn is formed as a multi-filament yarn and a second continuous yarn is formed as a crimped yarn consisting of thermoplastic fibers in a parallel thread sheet. The parallel thread sheet has a plurality of crimped continuous threads next to one another in one plane. The continuous threads are formed from as a collection of a plurality of continuous filaments.

14 Claims, 3 Drawing Sheets

(56) References Cited

U.S. PATENT DOCUMENTS

2010/0230851 A1    9/2010  Loubinoux et al.

FOREIGN PATENT DOCUMENTS

| EP | 0 599 695 A1 | 6/1994 | | |
|---|---|---|---|---|
| JP | H 04183729 A | 6/1992 | | |
| JP | 2006 291 377 A | 10/2006 | | |
| JP | 2015 067 926 A | 4/2015 | | |
| WO | WO-2017153763 A1 * | 9/2017 | ............. | B29C 70/20 |

* cited by examiner

HYBRID YARN AND DEVICE AND METHOD FOR PRODUCING A HYBRID YARN

FIELD OF THE INVENTION

The invention relates to a hybrid yarn consisting of thermoplastic fibers and reinforcing fibers, to a method, and to a device for producing said hybrid yarn.

BACKGROUND

Hybrid yarns in which yarns consisting of thermoplastic fibers are combined with reinforcing fibers are known from the prior art. Yarns in the form of continuous filaments, for example consisting of polyester, polyamide, or polyethylene, are used. For example, filaments consisting of glass fibers or carbon fibers (for example aramid) are used as reinforcing fibers. For example, DE 10 2007 028 373 A1 describes a hybrid yarn, in the production of which the individual components are brought together and then mixed using an air texturing method. This is intended to achieve the most homogeneous possible distribution of the individual filament types. EP 0 599 695 A1 also discloses a method for producing hybrid roving, in which method the various continuous filaments are spun together as webs into bundles. The reinforcing fibers and thermoplastic fibers are mixed here by a Venturi nozzle, which spins the filaments as webs onto the glass fiber. Another method for producing a hybrid yarn or hybrid roving is disclosed by DE 10 2011 010 592 A1. Here, individual rovings are formed from a few individual filaments of the different components, which are then brought together in a further method step and bundled to form a hybrid yarn.

JP 2015 067 926 A discloses the production of a hybrid yarn from a reinforcing fiber and a thermoplastic fiber. The plastic fiber is subjected to a temperature increase and subsequent false twisting before it is brought together with the reinforcing fiber. After being brought together, the hybrid yarn is formed with the aid of a pneumatic vortex nozzle and wound onto a bobbin.

The disadvantage of the known hybrid yarns produced by the above method is that parts of the reinforcing yarn are damaged during production and are thus weakened. The connection of the thermoplastic yarns to the reinforcing fibers to form a hybrid yarn is only achieved by the process step that causes damage. This process step necessary for forming the yarn comprises, for example, texturing, spinning or rolling. However, the reinforcing fibers used are as fine as possible, as a result of which mechanical or fluidic yarn formation or mixing results in damage to the reinforcing fibers and thus to the hybrid yarn.

SUMMARY OF THE INVENTION

A problem addressed by the invention is thus to provide a hybrid yarn, the production method thereof and the device necessary therefor, which avoids an additional method step for the formation of the hybrid yarn which moves the individual filaments or fibers after the individual components have been combined. In particular, by not including vortex yarn formation, the occurrence of fiber or filament damage can be countered.

Additional objects and advantages of the invention will be set forth in the following description, or may be obvious from the description, or may be learned through practice of the invention.

The problem is solved by a hybrid yarn, the production method thereof and the device having the features described and claimed herein.

To solve the problem, a novel hybrid yarn consisting of at least two continuous yarns is proposed, a first continuous yarn being a multi-filament yarn consisting of reinforcing fibers and a second continuous yarn being a crimped yarn consisting of thermoplastic fibers in the form of a parallel thread sheet. The parallel thread sheet is formed by arranging a plurality of crimped continuous threads next to one another in one plane. A continuous thread is to be understood as a collection of a plurality of continuous filaments. Because the second continuous yarn is a crimped (textured) yarn, it has the property of an irregularly formed surface, the texturing (crimping) also allowing the textured fibers to be shifted transversely to the direction of the fiber grain. Pressing the two continuous yarns thus results in high fiber friction between the first and second continuous yarn, which means that the filaments of the reinforcing fibers get caught in the crimped yarn and are thus held thereby. Processing the hybrid yarn further to bind the reinforcing fibers to the plastics fibers by, for example, interlacing, is thus unnecessary. The mutual grip of the yarns, which results from the use of a textured yarn, leads to sufficient stability for further processing of the hybrid yarn. In addition, the crimp of the thermoplastic fibers is at least partially laid over the filaments of the reinforcing yarn, which results in additional protection of the filaments of the reinforcing yarn. Further processing can take place, for example, by means of a weaving process, or the hybrid yarn can be used for inlay in all types of nonwovens or composite materials.

The first continuous yarn is advantageously a multi-filament yarn consisting of carbon with little ondulation. There is little ondulation if only a small proportion of the filaments in the continuous yarn are not arranged parallel to a yarn grain direction. Transverse filaments can lead to the formation of knots and weaken the continuous yarn. In addition to carbon as a fiber material, other high-quality reinforcing fibers are also conceivable, for example aramid fibers, nylon fibers, glass fibers or polymethyl methacrylate fibers. Such continuous yarns are known from the prior art. The first continuous yarn preferably consists of 6,000 to 60,000 filaments having a tensile strength of at least 500 kg/mm$^2$. The first continuous yarn particularly preferably consists of 12,000 to 24,000 filaments; this number of filaments has proven to be particularly suitable for producing the hybrid yarn using the method described. The filaments are arranged so as to result in a band-like, flat, continuous yarn (for example Torayca T700 from the manufacturer Toray). Such continuous yarns are processed very finely, resulting in a specific weight of 400 grams to 8,000 grams or 800 grams to 1,600 grams per 1,000 meters.

The second continuous yarn is advantageously produced from a polyethylene (PE), a polypropylene (PP), a polyamide (PA), a polyester (PES), or a polyaryletherketone (e.g. polyetheretherketone, PEEK) and has a titer of 20 to 500 dtex, these specifications referring to a single continuous thread from the thread sheet which, in its entirety, represents the second continuous thread. The use of thermoplastic plastics materials has proven to be advantageous. The second continuous yarn is preferably a thread sheet consisting of a plurality of core yarns, the core yarns consisting of an uncrimped core fiber and crimped wrapping fibers and the core fibers being of the same material as the wrapping fibers. Such crimped or textured yarns are also known from the prior art and are available wound on bobbins in a stretched state. The production of such yarns for use as second continuous yarns using an air texturing method has proven successful.

In order to allow the two continuous yarns in the hybrid yarn to grip one another, a hybrid yarn which has a first continuous yarn consisting of 12,000 filaments preferably contains a second continuous yarn having a thread sheet of 10 to 200 continuous threads. The exact size of the second continuous yarn depends on the material used and the selected yarn thickness. However, it has been shown that a thread sheet which has fewer than 10 continuous threads, leads to such a low distribution within the hybrid yarn that the hybrid yarn cannot be properly held together without a further processing step such as the air texturing known from the prior art. However, this in turn would result in the fibers being damaged and the hybrid yarn being weakened.

To produce a hybrid yarn, a device is proposed which has the following components:
- an unwinding device for unwinding a first continuous yarn from a bobbin, the unwinding device being provided with a brake;
- a tension sensor for measuring the tension in the first continuous yarn
- a relief spreader for spreading the first continuous yarn in the form of a compact band;
- a first pair of clamping rollers and a second pair of clamping rollers;
- a flow spreader arranged between the pairs of clamping rollers to form a spread-out first continuous yarn;
- a large number of bobbins which are arranged on a creel and have crimped continuous threads to form the second continuous yarn;
- a comb for forming a parallel thread sheet from the continuous threads;
- a laying roller for depositing the spread-out first continuous yarn and the thread sheet of the second continuous yarn, the thread sheet being laid over the spread-out continuous yarn to form a thread sheet of the hybrid yarn;
- at least two deflectors, an arrangement of the deflectors resulting in the laying roller being wrapped by the spread-out first continuous yarn and the thread sheet of the second continuous yarn by more than 30 degrees;
- a pair of pressure rollers for pressing the thread sheet into a hybrid yarn; and
- a winding device for the hybrid yarn to form a bobbin.

The first continuous yarn, which is in the form of a band wound on a bobbin, is drawn off the bobbin held in an unwinding device with the aid of the first pair of clamping rollers. After leaving the bobbin, the first continuous yarn passes through a tension sensor and subsequently a relief spreader and spreading rollers. The current tension of the first continuous yarn is measured using the tension sensor. The unwinding device is equipped with a brake on which a controller acts and sets a predetermined target value for the yarn draw-off. A tight or regulated tension in the first continuous yarn is a prerequisite for an optimal spreading process. In a relief spreader, a deflection roller is shifted in a direction transverse to the transport direction of the filaments of the first continuous yarn at a low amplitude and high frequency. As a result, the continuous yarn is lifted out of the transport path by the deflection roller and the continuous yarn is stressed and relieved in rapid, repetitive sequence, as a result of which the individual filaments of the first continuous yarn are detached from one another and stretched in width. In addition, the high frequency of the movement loosens a preparation film or protective varnish that may be present on the first continuous filament, so that this falls off the continuous filaments in the subsequent spreading rollers due to a deflector with a small radius. Relief spreaders and the spreading rollers used are known from the prior art and are widely used in the processing of multi-filament yarns.

The first pair of clamping rollers is followed by a second pair of clamping rollers, a flow spreader being arranged between the pairs of clamping rollers. The two pairs of clamping rollers are motor-driven and serve to unwind and convey the first continuous yarn. The first continuous yarn is drawn off the bobbin by the first pair of clamping rollers and subsequently through the relief spreader and the spreading rollers. The second pair of clamping rollers, on the other hand, regulates the immersion depth of the filaments in the flow spreader. The flow spreader is arranged between the first and the second pair of clamping rollers. The first continuous yarn is drawn between two support rollers by an air flow. The air flow is usually guided from top to bottom through the filaments of the first continuous yarn. The air flow is generated by a vacuum source, which draws the air flowing through the filaments downwards. The flow causes the filaments to be further separated and components of protective layers or coatings which still adhere are sucked off. During this process, the filaments are pulled down. So that they are not drawn too deeply into the flow spreader and thereby damaged, the filaments are pulled off by the driven, second pair of clamping rollers. Alternatively, the flow spreader can also be supplemented by a corresponding sensor, which causes a change in the speed of the second pair of clamping rollers if the filaments penetrate the flow spreader too deeply or too little.

Furthermore, a large number of bobbins with crimped continuous threads for forming the second continuous yarn is provided on a creel. The number of bobbins corresponds to the number of continuous threads which, together with the first continuous yarn, are to form the hybrid yarn. The continuous threads are drawn off the bobbins and guided over a comb. Owing to the comb, the individual continuous threads are arranged close to one another and thus form the thread sheet of the second continuous yarn. With the aid of the comb, the continuous threads can be placed very close to one another without the individual continuous threads crossing each other in their further course.

In the further course, the spread-out first continuous yarn and the thread sheet of the second continuous yarn are guided onto a laying roller. The thread sheet of the second continuous yarn is deposited on the surface of the spread-out first continuous yarn. The two components have the same speed. The laying roller is usually driven. At least two deflectors are arranged downstream of the laying roller, the first deflector being arranged in relation to the laying roller in such a way that the laying roller is wrapped around by a minimum of more than 30 degrees. The laying roller being wrapped by the components of the hybrid yarn deposited on top of one another causes the individual filaments of the first and second continuous yarn to be nestled against one another. The laying roller and the subsequent deflectors contribute to the formation of a thread sheet of the hybrid yarn. The deflectors can be formed from freely rotating rollers, stationary guide rods or with the aid of air flows. It is not absolutely necessary to drive the deflectors. The pretension with which the first continuous yarn and the thread sheet of the second continuous yarn are deposited on the laying roller is matched such that no or only insignificant deformations result due to the tension conditions for the later winding of the formed hybrid yarn.

After leaving the second deflector, the thread sheet of the hybrid yarn is guided into a pair of pressure rollers. The pair of pressure rollers comprises a driven lower roller and an upper roller having a resilient surface. The upper roller is pressed against the lower roller by means of an actuator. Pneumatic or hydraulic pressure cylinders can be used as the actuator. Spring-loaded or weight-loaded actuators are also conceivable. The pressure acting between the upper roller and the lower roller on the thread sheet of the hybrid yarn is to be adjusted depending on the materials used for the hybrid yarn, but is typically 200 to 500 N/cm². The pair of pressure rollers acts as a conveyor drive for the thread sheet of the hybrid yarn and also presses the introduced thread sheet of the hybrid yarn. As a result of the pressing, the continuous fibers of the first continuous yarn and the individual second continuous threads are pressed against one another. By using textured second continuous threads, they produce a mechanical connection to the filaments of the first continuous yarn; the filaments of the first continuous yarn are practically clamped between the second continuous threads by the textured structure of said threads.

After pressing, the hybrid yarn is wound in a winding device to form a bobbin. Winding devices known from spinning technology are used here. Advantageously, a heating section for linking the continuous yarns is provided upstream of the winding device. When passing through the heating section, individual filaments of the second continuous yarn, which, due to the crimping, partially protrude from the yarn structure as individual filaments, are melted on the surface. This melting of the texture results in a connection between the second continuous threads and thus in a further improved bond between the filaments of the first continuous yarn and the second continuous yarn.

The comb is preferably adjustable in order to set an arrangement of the individual second continuous threads, mutually and in relation to the spread-out first continuous yarn. A mutual adjustment relates to a setting of individual comb widths of the comb, which results in a distribution of the continuous threads of the second continuous yarn which is non-uniform or arranged in a specific pattern. The thread sheet which is formed from the second continuous threads can consist of continuous threads arranged uniformly next to one another at an identical spacing. By mutually adjusting the comb, the continuous threads can also be distributed next to one another at different spacings. An adjustment of the comb in relation to the spread-out first continuous yarn causes a change in a position of the entire comb. By shifting the position of the comb, the thread sheet of the second continuous yarn formed from the continuous threads can be variably aligned with the thread sheet of the first continuous yarn. For example, the continuous threads of the second continuous yarn arranged on the lateral edge can be guided more densely, i.e. at a smaller spacing, than the continuous threads arranged centrally in the thread sheet. The adjustability of the comb can also be understood as a simple exchange of the comb. By using different combs and adjusting the position thereof accordingly, the first continuous yarn can be blended with the second continuous yarn in a variety of ways.

Furthermore, two creels are advantageously provided for covering the spread-out first continuous yarn on the laying roller with a thread sheet of the second continuous yarn each from an upper side and a lower side. With the second creel, too, the individual continuous threads are guided from the bobbins through a comb and transferred to the laying roller in a parallel arrangement. By introducing two thread sheets of the second continuous yarn from both sides of the spread-out first continuous yarn, the ratio of the number of filaments of the first continuous yarn to the number of continuous threads of the second continuous yarn can be reduced. If the ratio remains the same, however, a first continuous yarn which has a larger number of filaments (or fibrils) can be used.

In order to improve the spreading out of the first continuous yarn or to be able to use a first continuous yarn which has a higher number of filaments or fibrils, two or more flow spreaders connected in series are advantageously arranged between the first pair of clamping rollers and the second pair of clamping rollers.

In a further development of the device, a spray head for applying an additive and a subsequent heating section are provided upstream of the winding device. Powders, which are sprayed onto the hybrid yarn, are preferably used as additives. The powder used is preferably of the same material as the second continuous yarn and has a grain size of 20 µm to 500 µm; the grain size is preferably 100 µm. However, different materials to the material of the second continuous yarn can also be used, such as polyester. The subsequent heating of the hybrid yarn sprinkled with the powder melts the individual grains of the powder and bakes them to the fibers of the second continuous yarn. This process improves the adhesion of the reinforcing fibers to the fibers of the second continuous yarn and creates a particularly dimensionally stable hybrid yarn for the use of the hybrid yarn in subsequent processing steps.

A method for producing hybrid yarn is also proposed which comprises the following method steps:

unwinding a first continuous yarn in the form of a multi-filament yarn consisting of reinforcing fibers from a bobbin, the yarn tension being measured using a tension sensor and controlled by a brake;

guiding the first continuous yarn over a relief spreader and subsequent spreading rollers to a first pair of clamping rollers;

downstream of the first pair of clamping rollers, the first continuous yarn is guided, as a spread-out first continuous yarn, to a second pair of clamping rollers via a flow spreader which is connected to a vacuum source;

unwinding crimped threads of the second continuous yarn from bobbins mounted on a creel;

forming a parallel thread sheet from the crimped continuous threads over a comb, as a result of which the large number of continuous threads of the second continuous yarn are aligned parallel to the course of the spread-out first continuous yarn;

bringing and superimposing the spread-out first continuous yarn and the thread sheet of the second continuous yarn on a laying roller to form a thread sheet of a hybrid yarn;

guiding the thread sheet of the hybrid yarn over at least two deflectors to a pair of pressure rollers;

pressing the thread sheet of the hybrid yarn between the pair of pressure rollers to form a hybrid yarn; and winding the hybrid yarn in a winding device.

The hybrid yarn is preferably passed through a heating section after pressing and before winding. It is also advantageous if the linking of the first continuous yarn and the second continuous yarn is optimized by regulating a thread tension of the thread sheet of the second continuous yarn. Since the second continuous yarn is a more or less elastic yarn due to the choice of material or in the design of a core yarn, the effect of the linking with the filaments of the first continuous yarn can be changed by a corresponding tension of the second continuous yarn. Care must be taken to ensure that the thread sheet is not pretensioned to such an extent that this results in a deformation of the hybrid yarn.

Preferably, after passing through a first flow spreader, the first continuous yarn is guided into a second flow spreader before reaching the second pair of clamping rollers. This achieves an improvement and an increased uniformity of the spread.

Advantageously, downstream of the pair of pressure rollers, the hybrid yarn is sprayed with an additive in a spray head and then passes through a heating section. As a result of the subsequent heating of the hybrid yarn sprinkled with the powder, the individual grains of the powder are melted and baked to the fibers of the second continuous yarn. This process improves the adhesion of the reinforcing fibers to the fibers of the second continuous yarn and creates a particularly dimensionally stable hybrid yarn for the use of the hybrid yarn in subsequent processing steps.

In a further development of the method, a thread sheet of the second continuous yarn is deposited in each case on the laying roller on both sides of the spread-out first continuous yarn.

BRIEF DESCRIPTION OF THE DRAWINGS

The invention is described below on the basis of an exemplary embodiment and explained in more detail with the drawings.

DETAILED DESCRIPTION

Figure 1:
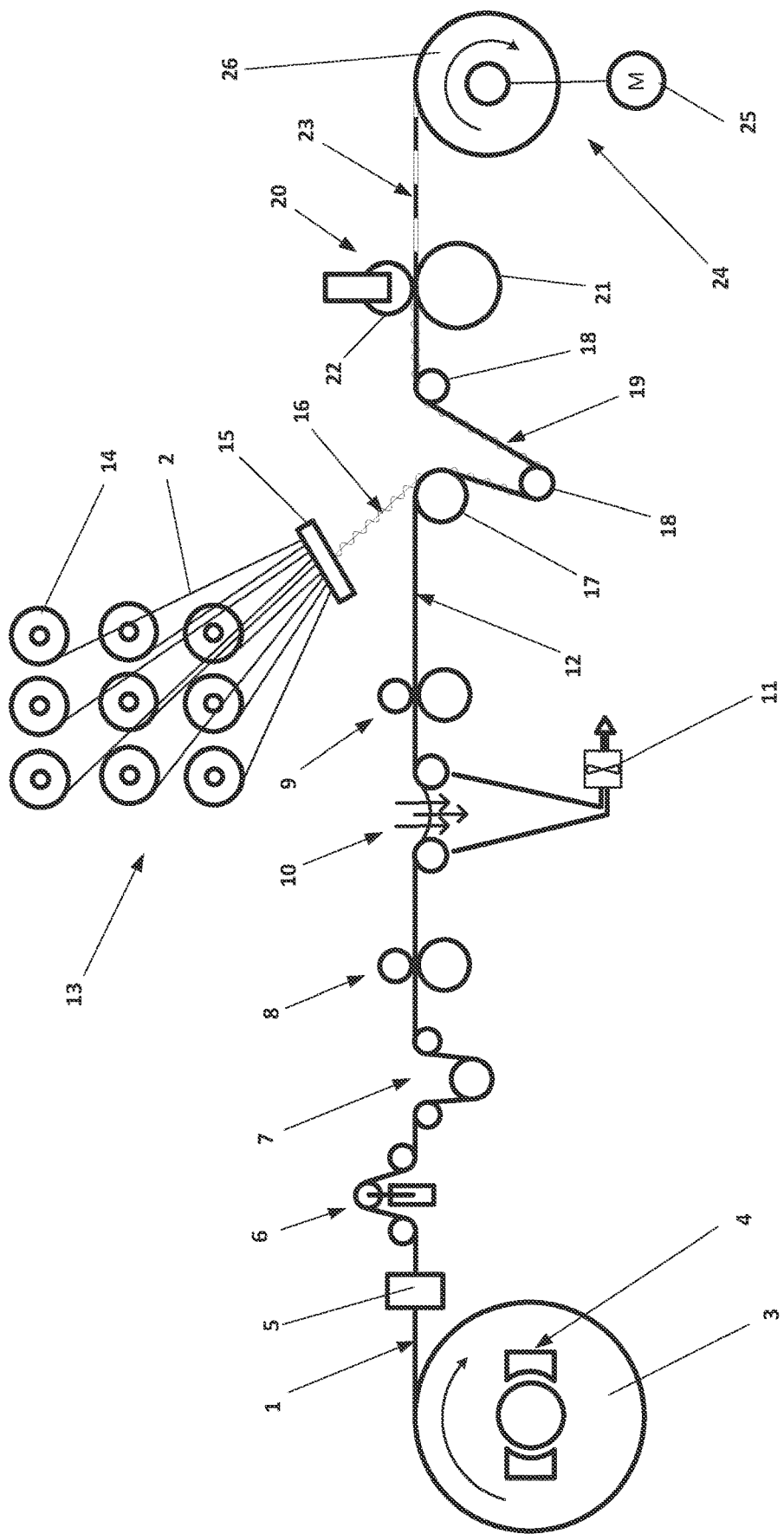
FIG. 1 shows schematically a first embodiment of the method according to the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows schematically the method for producing the hybrid yarn in a first embodiment. A first continuous yarn 1 is unwound from a bobbin 3, while the bobbin 3 rotates in the direction of the arrow. The first continuous yarn 1, which is a reinforcing yarn in the form of a band consisting of a large number of filaments, is passed through a tension sensor 5 downstream of the bobbin 3. The tension sensor 5 measures the tension in the first continuous yarn 1 and acts on a brake 4 of the bobbin 3 via a controller, such that the first continuous yarn 1 is unwound from the bobbin 3 at a constant tension. As a result, the first continuous yarn 1 runs through a relief spreader 6 and subsequent spreading rollers 7 and then reaches a first pair of clamping rollers 8. The first pair of clamping rollers 8 is the actual conveying element, which unwinds the first continuous yarn 1 from the bobbin 3 and pulls it through the tension sensor 5, the relief spreader 6, and the spreading rollers 7.

The first continuous yarn 1 is guided to a second pair of clamping rollers 9 via a flow spreader 10. The second pair of clamping rollers 9 is used to determine the depth of immersion of the first continuous yarn 1 in the flow spreader 10. In the flow spreader 10, the first continuous yarn 1 is guided through an air flow which is generated with the aid of a vacuum source 11. The air flow is guided from top to bottom through the first continuous yarn 1 in the form of a band. This has the effect that the first continuous yarn 1, which has already been partially spread out by the relief spreader 6 and the spreading rollers 7, is spread out further and is at least partly separated into its filaments. Owing to the arrangement of the air flow, any foreign bodies that are still present or protective layers or coatings that have been broken up by the previous spreading are sucked off. Downstream of the second pair of clamping rollers 9, the now spread-out first continuous yarn 12 is guided to a laying roller 17.

A large number of continuous threads are drawn off from a large number of bobbins 14, which are arranged in a creel 13, and arranged over a comb 15 to form a thread sheet 16 of the second continuous yarn 2. The thread sheet 16 of the second continuous yarn 2 is then deposited on the laying roller 17 and thus on the spread-out first continuous yarn 12 or on and next to or between the filaments of the spread-out first continuous yarn 12. On the laying roller 17, the filaments of the spread-out first continuous yarn 12 are combined with the thread sheet 16 of the second continuous yarn 2 to form a thread sheet 19 of a hybrid yarn. The thread sheet 19 of the hybrid yarn is deflected via two deflectors 18 downstream of the laying roller 17, such that the laying roller 17 is wrapped around as little as possible. The thread sheet 19 of the hybrid yarn then reaches a pair of pressure rollers 20. The pair of pressure rollers 20 consists of a lower pressure roller 21 and an upper pressure roller 22, the upper pressure roller 22 being equipped with an actuator for adjusting the pressure. The thread sheet 16 of the second continuous yarn 2 and the spread-out first continuous yarn 12 are pulled over the laying roller 17 by the pair of pressure rollers 20. At the nip point of the pair of pressure rollers 20, the actual hybrid yarn 23 is formed from the thread sheet 19 of the hybrid yarn and is then wound in a winding device 24 to form a bobbin 26. The bobbin 26 is rotated in the direction of the arrow by a drive 25 for winding the hybrid yarn 23.

Figure 2:
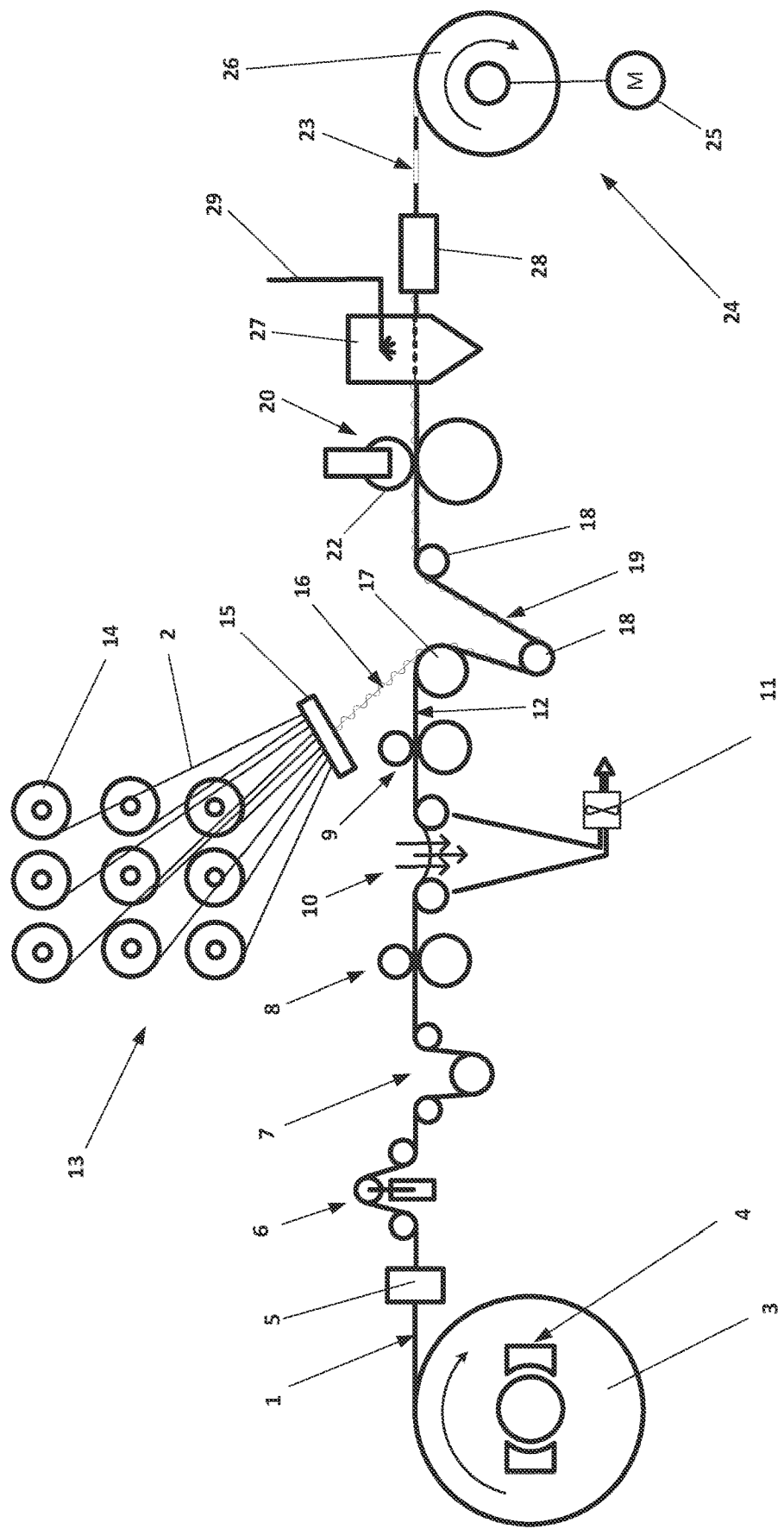
FIG. 2 shows schematically a second embodiment of the method according to the invention.

FIG. 2 shows schematically the method for producing the hybrid yarn in a second embodiment. The second embodiment differs from the first embodiment in a further method step for forming the hybrid yarn after passing through the pair of pressure rollers 20 and upstream of the winding device 24. The formation of the thread sheet 19 of the hybrid yarn, starting from the first continuous yarn 1 removed from a bobbin 3, and from the continuous threads of the second continuous yarn 2 removed from bobbins 14, is identical to the embodiment according to FIG. 1.

After leaving the pair of pressure rollers 20, the hybrid yarn 23 is sprayed with an additive 29. The powdered additive 29 is applied to the surface of the hybrid yarn 23 by a spray head 27. The hybrid yarn 23 is then guided through a heating section 28 to the winding device 24. The applied additive 29 is melted in the heating section 28 and connects the continuous threads of the second continuous yarn 2 within the hybrid yarn 23. This improves the cohesion of the hybrid yarn 23 during subsequent processing.

Figure 3:
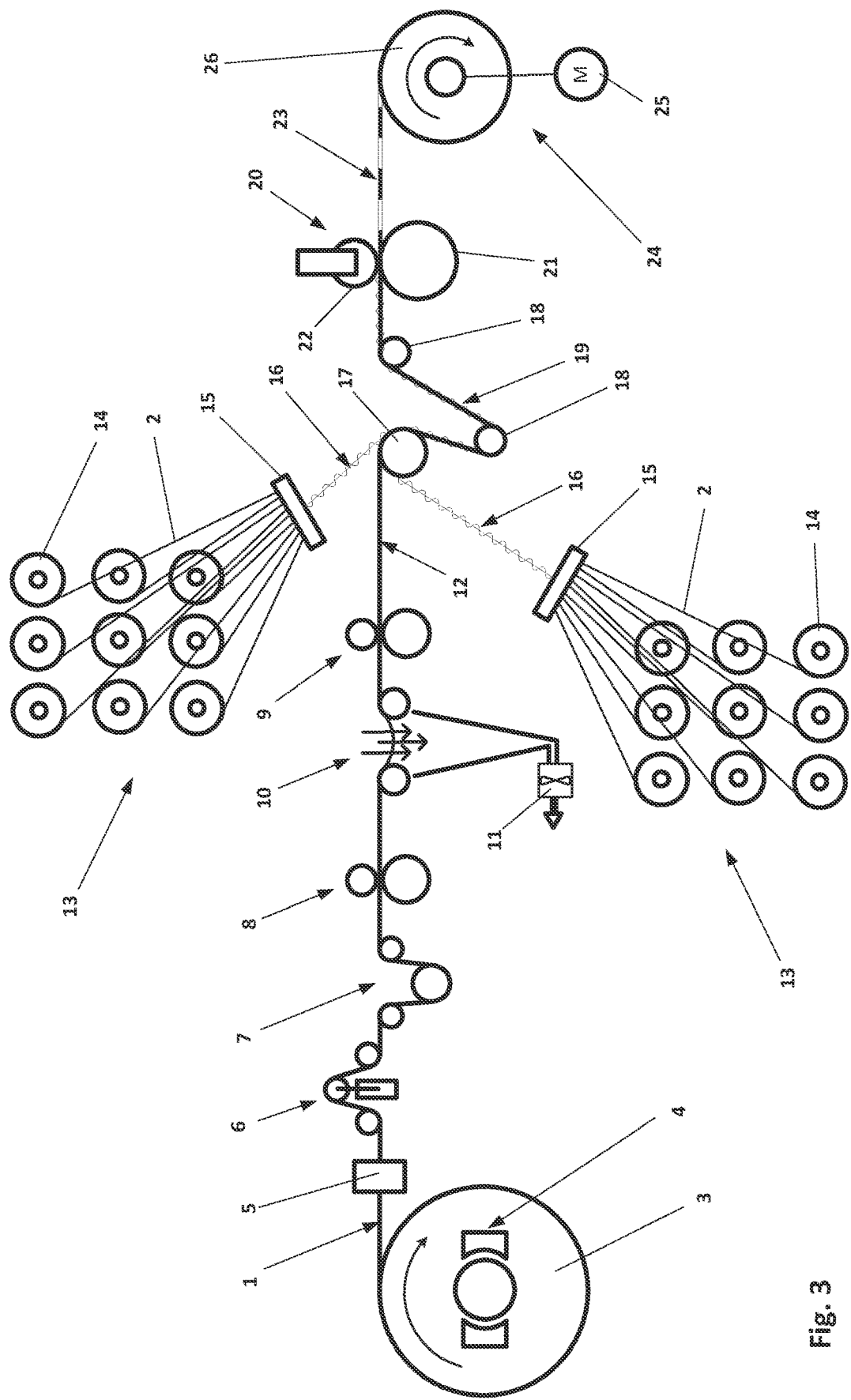
FIG. 3 shows schematically a third embodiment of the method according to the invention.

In a third embodiment of the method for producing the hybrid yarn 23, as can be seen from FIG. 3, a further feed of a thread sheet 16 of the second continuous yarn 2 is provided. The method for producing the hybrid yarn 23 in the third embodiment is identical, in the execution of the method steps and the arrangement of the individual devices, with the first embodiment according to FIG. 1 with the exception of the second introduced creel 13. By introducing a second creel 13 with bobbins 14 arranged therein, a second thread sheet 16 of the second continuous yarn 2 can be formed over a second comb 15 and applied to the laying roller 17. In this case, this second thread sheet 16 is guided onto the laying roller 17 on a side of the spread-out first continuous yarn 12 opposite the first thread sheet 16. The spread-out first continuous yarn 12 is thus introduced between the two thread sheets 16. By setting the combs 15, an optimal distribution of the second continuous yarn 2 over the width of the spread-out first continuous yarn 12 can be achieved.

The present invention is not limited to the embodiments shown and described. Modifications within the scope of the claims are possible, as is a combination of the features, even if these are shown and described in different embodiments.

LIST OF REFERENCE SIGNS

1 First continuous yarn
2 Second continuous yarn
3 Bobbin of first continuous yarn
4 Brake
5 Tension sensor
6 Relief spreader
7 Spreading rollers
8 First pair of clamping rollers
9 Second pair of clamping rollers
10 Flow spreader
11 Vacuum source
12 Spread-out first continuous yarn
13 Creel
14 Bobbin of second continuous yarn
15 Comb
16 Thread sheet of second continuous yarns
17 Laying roller
18 Deflector
19 Thread sheet of hybrid yarn
20 Pair of pressure rollers
21 Lower pressure roller
22 Upper pressure roller
23 Hybrid yarn
24 Winding device
25 Drive
26 Bobbin of hybrid yarn
27 Spray head
28 Heating section
29 Additive

The invention claimed is:

1. A hybrid yarn, comprising:
a first continuous yarn formed as a multi-filament yarn;
a second continuous yarn formed as a parallel thread sheet comprising a plurality of crimped continuous threads next to one another in one plane;
wherein each of the continuous crimped threads in the parallel thread sheet comprises a collection of a plurality of continuous filaments that include crimped wrapping fibers; and
wherein protruding individual filaments of the crimped wrapping fibers second continuous yarn are melted and bonded onto filaments of the first continuous yarn.

2. The hybrid yarn according to claim 1, wherein the multi-filament yarn of the first continuous yarn comprises from 6,000 to 60,000 filaments having a tensile strength of at least 500 kg/mm$^2$.

3. The hybrid yarn according to claim 1, wherein the second continuous yarn comprises any one or combination of a polyethylene, a polypropylene, a polyamide, a polyester, or a polyaryletherketone, and has a titer of 20 to 500 dtex.

4. The hybrid yarn according to claim 1, wherein the multi-filament yarn of the first continuous yarn has 12,000 filaments.

5. A hybrid yarn, comprising:
a first continuous yarn formed as a multi-filament yarn;
a second continuous yarn formed as a parallel thread sheet comprising a plurality of crimped continuous threads next to one another in one plane;
wherein each of the crimped continuous threads in the parallel thread sheet comprises a collection of a plurality of continuous filaments; and
wherein the parallel thread sheet of the second continuous yarn comprises a plurality of core yarns of a non-crimped core fiber and crimped wrapping fibers, the non-crimped core fibers being of a same material as the crimped wrapping fibers.

6. A system for producing a hybrid yarn having at least two continuous yarns, the system comprising:
an unwinding device that unwinds a first continuous yarn from a bobbin, the unwinding device comprising a brake;
a tension sensor configured to measure tension in the first continuous yarn;
a relief spreader configured to spread out the first continuous yarn to form of a compact band;
a first pair of clamping rollers, and a second pair of clamping rollers;
a flow spreader arranged between the first and second pairs of clamping rollers to form a spread-out first continuous yarn;
a plurality of bobbins are arranged on a first creel, each of the bobbins supplying a crimped continuous thread to form a second continuous yarn;
a comb arranged with the plurality of bobbins to form the second continuous yarn as a parallel thread sheet from the continuous threads supplied by the bobbins;
a laying roller configured to deposit the spread-out first continuous yarn with the parallel thread sheet forming the second continuous yarn, wherein the parallel thread sheet is laid over the spread-out continuous yarn to form a thread sheet;
at least two deflectors arranged such that the laying roller is wrapped by the spread-out first continuous yarn and the parallel thread sheet forming the second continuous yarn by at least 30 degrees;
a pair of pressure rollers configured to press the thread sheet into the hybrid yarn; and
a winding device configured to wind the hybrid yarn to form a bobbin.

7. The system according to claim 6, further comprising a heating section upstream of the winding device configured to link the first and second continuous yarns.

8. The system according to claim 6, further comprising a second creel with a plurality of bobbins each supplying a crimped continuous thread to form a second parallel thread sheet, the second creel arranged such that on the laying roller a first side of the spread-out first continuous yarn is covered by the parallel thread sheet and an opposite side of the spread-out first continuous yarn is covered by the second parallel thread sheet.

9. The system according to claim 6, further comprising a spray head upstream of the winding device to apply an additive to the hybrid yarn.

10. A method for producing a hybrid yarn, the method comprising:
unwinding a first continuous yarn in the form of a multi-filament yarn from a bobbin;

measuring a yarn tension of the first continuous yarn with a tension sensor and controlling the yarn tension with a brake configured with the bobbin;

guiding the first continuous yarn to a first pair of clamping rollers via a relief spreader and spreading rollers;

downstream of the first pair of clamping rollers, guiding the first continuous yarn as a spread-out first continuous yarn to a second pair of clamping rollers via a flow spreader connected to a vacuum source;

unwinding a crimped continuous thread from a plurality of bobbins mounted on a creel, the crimped continuous threads forming a second continuous yarn;

with a comb, forming the crimped continuous threads into a parallel thread sheet wherein the crimped continuous threads are aligned parallel to a course of the spread-out first continuous yarn;

superimposing the spread-out first continuous yarn and the parallel thread sheet on a laying roller to form a thread sheet;

guiding the thread sheet over at least two deflectors to a pair of pressure rollers;

with pressure rollers, pressing the thread sheet to form the hybrid yarn; and winding the hybrid yarn in a winding device.

11. The method according to claim 10, further comprising guiding the hybrid yarn through a heating section after the pressure rollers and before the winding device.

12. The method according to claim 10, further comprising regulating a thread tension of the thread sheet to optimize a linking of the first continuous yarn with the second continuous yarn.

13. The method according to claim 10, further comprising spraying the hybrid yarn with an additive and passing the sprayed hybrid yarn through a heating section downstream of the pair of pressure rollers.

14. The method according to claim 10, further comprising, at the laying roller, depositing a second parallel thread sheet of the crimped continuous fibers onto an opposite side of the spread-out first continuous yarn.

\* \* \* \* \*